(12) United States Patent
Janssen et al.

(10) Patent No.: US 7,725,527 B2
(45) Date of Patent: May 25, 2010

(54) SERVER-BASED COMPUTING ENVIRONMENT

(75) Inventors: Bob Janssen, Lage Zwaluwe (NL); Peter Gerardus Jansen, Eindhoven (NL)

(73) Assignee: Real Enterprise Solutions Development B.V., Bussum (NL)

( * ) Notice: Subject to any disclaimer, the term of this patent is extended or adjusted under 35 U.S.C. 154(b) by 2173 days.

(21) Appl. No.: 10/040,149

(22) Filed: Jan. 2, 2002

(65) Prior Publication Data

US 2002/0188672 A1    Dec. 12, 2002

(30) Foreign Application Priority Data

Jun. 8, 2001    (EP)    ................................ 01202210

(51) Int. Cl.
*G06F 15/16* (2006.01)
*G06F 3/00* (2006.01)

(52) U.S. Cl. .................... 709/203; 709/217; 715/740

(58) Field of Classification Search ......... 715/740–753, 715/790–804; 709/201–205, 216–232
See application file for complete search history.

(56) References Cited

U.S. PATENT DOCUMENTS

| | | | | |
|---|---|---|---|---|
| 5,408,602 A | * | 4/1995 | Giokas et al. ............... | 715/733 |
| 5,485,570 A | * | 1/1996 | Busboom et al. ............ | 715/751 |
| 5,548,779 A | | 8/1996 | Andert et al. | |
| 5,613,090 A | * | 3/1997 | Willems ...................... | 719/329 |
| 5,758,110 A | * | 5/1998 | Boss et al. ................... | 715/751 |
| 5,793,368 A | | 8/1998 | Beer | |
| 5,805,442 A | * | 9/1998 | Crater et al. ................... | 700/9 |
| 5,909,545 A | * | 6/1999 | Frese et al. .................. | 709/208 |
| 6,675,193 B1 | * | 1/2004 | Slavin et al. ................ | 709/200 |
| 6,675,371 B1 | * | 1/2004 | York et al. ................... | 717/114 |
| 2002/0109718 A1 | * | 8/2002 | Mansour et al. ............. | 345/744 |

FOREIGN PATENT DOCUMENTS

| | | |
|---|---|---|
| WO | 9102305 A1 | 2/1991 |
| WO | WO 97 28623 | 8/1997 |
| WO | WO 99/63430 * | 5/1999 |

OTHER PUBLICATIONS

Remote Desktop Protocol (RDP) Features and Performance, Microsoft Corporation, Jun. 2000.* rdesktop : A Remote Desktop Protocol Client, URL: http://web.archive.org/web/20010201052500/http://www.rdesktop.org/, Feb. 1, 2001.*

(Continued)

*Primary Examiner*—Yasin M Barqadle
(74) *Attorney, Agent, or Firm*—Knoble, Yoshida & Dunleavy, LLC

(57) ABSTRACT

A server-based computing system includes at least one server (1) and at least one client computer (5), connected to the server (1) through a network (2). The server (1) includes apparatus for providing the client computer (5) with a user interface. The client computer (5) includes an input device (8) for providing input to an application through the user interface and a display device (7) for presenting output from an application through the user interface. The server (1) includes apparatus for running the application and the client computer (5) includes apparatus for locally running at least one further application. The system includes apparatus for controlling the locally run applications through the user interface provided by the server (1).

8 Claims, 3 Drawing Sheets

OTHER PUBLICATIONS

VNC Release History and Screenshot.*

MSN encarta definition of "provide", printed from encarta.msn.com.*

Designing Web-Based User Interfaces, by Scott Ambler, Jun. 29, 2001, printed from ddj.com.*

European Patent Office, "Communication Pursuant to Article 94(3) EPC", May 5, 2008.

* cited by examiner

SERVER-BASED COMPUTING ENVIRONMENT

BACKGROUND OF THE INVENTION

The invention relates to a server-based computing system, comprising at least one server and at least one client computer, connected to the server through a network, wherein the server comprises means for providing the client computer with a user interface, wherein the client computer comprises an input device for providing input to an application and a display device for presenting output from an application through the user interface, wherein the server comprises means for running the application, wherein the client computer comprises means for locally running at least one further application.

The invention further relates to a method for providing a client computer with a user interface for controlling at least one application that can be run locally on the client computer, which client computer is connected to a server through a network and comprises a display device, an input device and means for running the application.

Known systems of the above-mentioned kind are capable of providing a user interface to the client computer, enabling the client computer to control an application running on the server. Such a set-up is useful in networks containing several client computers. Applications are all installed on the server and can thus be centrally managed, updated, etc. Because the client computers only process the input from the user and present output from the application to the user, they can be very simple. They can, for example, be equipped with small hard disks or none at all and little processing power. Consequently, such client computers are known as thin clients.

However, it is not always wise or possible to rely only on server-based computing. It is sometimes desirable to run applications locally on the client. In existing systems, such applications have to be initialised separately. The user shuts down the user interface provided by the server and separately starts up the second, locally running, application.

In the known system and known method of the kind mentioned above, the client computer generates a user interface for controlling the locally running application. This gives scope for confusion, since a user has to clearly distinguish between user interfaces, remember separate functions, get used to different visual aids, etc. Without careful management and updating of all the client computers, a situation can easily arise wherein each client computer attached to the network has its own user interface.

SUMMARY OF THE INVENTION

The present invention provides a system and method of the kind mentioned above wherein the user interface is easy to use and manage.

Accordingly the system according to the invention is characterised in that the system comprises means for controlling the locally run applications through the user interface provided by the server.

The method according to the invention is characterised in that the user interface to the applications is provided by the server.

Thus, a system manager can centrally manage the user interface. Updates, for example, need only be installed once. It is not necessary to use cumbersome methods for remotely installing updates on each client computer or install updates from a CD on each client computer. Users can work on a different client computer, without having to adjust the settings according to their preferences or wait until their settings have been downloaded onto the client computer.

In a preferred embodiment, the system according to the invention comprises means for controlling an application running on the server and further applications, running locally, through the user interface.

Thus, it is possible to integrate the local and central computing environments, so that a user will not notice any difference between locally and centrally running applications. In the system according to the invention, it is not necessary to switch between separate user interfaces, nor is it necessary to overlay one user interface over another with consequent deterioration of the quality of display and control.

In another preferred embodiment, the user interface comprises means for initiating a locally run application. This feature further contributes to the single integrated computer environment. The user interface allows initialisation of every application in the same manner, irrespective of whether it is run locally on the client computer or centrally on the server.

BRIEF DESCRIPTION OF THE DRAWINGS

The invention will now be explained in further detail with reference to the enclosed drawings, of which

DETAILED DESCRIPTION OF THE PREFERRED EMBODIMENTS

Figure 1:
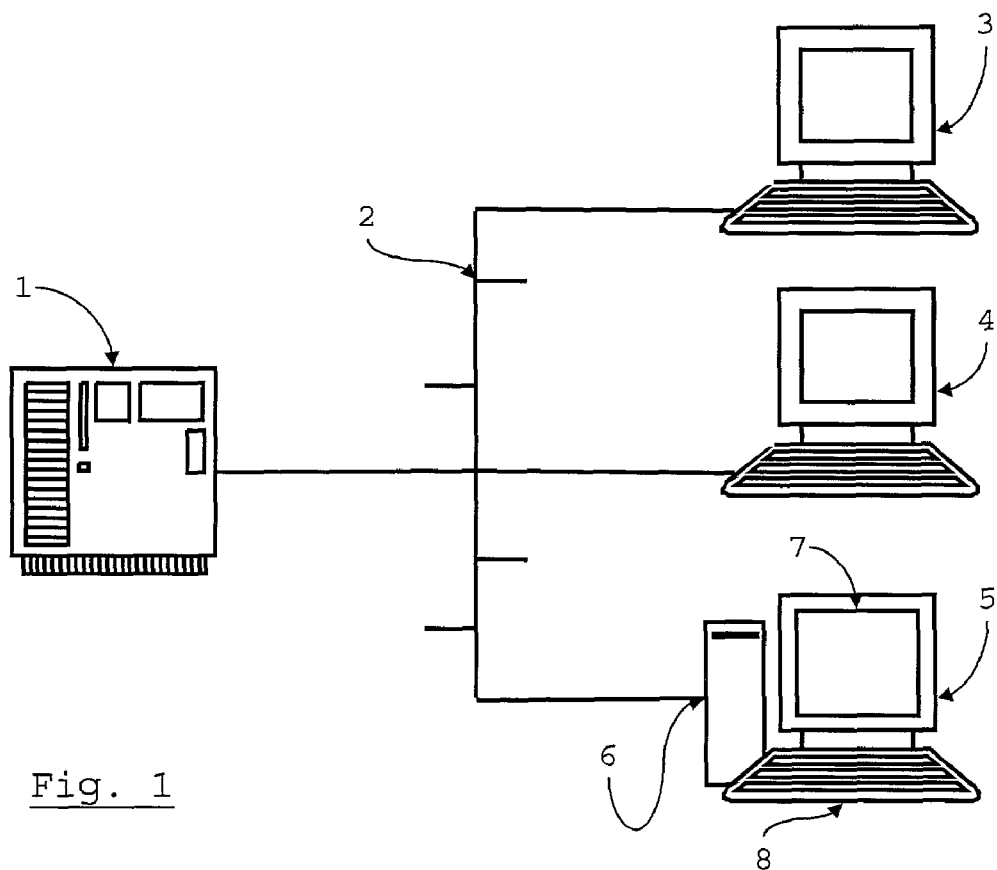
FIG. 1 shows an embodiment of the system according to the invention.

FIG. 1 shows schematically an example of a system according to the invention. The system comprises a server 1, attached to a network 2. The server 1 comprises one or more processors, RAM, and storage means, e.g. an array of hard disks. The processing capacity and memory are sufficient for running several demanding applications concurrently on the server 1. The invention is not limited to server-based computing systems comprising only one server. There can be several central servers, collectively known as a server farm. In this case, processing and storage capacity could be unevenly distributed over the servers, with some servers dedicated to running demanding applications and others to storing or transmitting data.

The network 2 can be a Local Area Network, a Wide Area Network or the Internet. It can contain wireless connections, dial-up connections or fixed cable connections.

FIG. 1 shows three client computers 3-5, attached to the network 2. Of course, the invention is not limited to the particular configuration of FIG. 1. Any number of client computers could be attached to the network 2. The client computers 3-5 can be of any kind.

A first and second client computer 3, 4 respectively, comprise a screen, a keyboard and/or a pointer device, such as a mouse. The server 1 provides these client computers 3,4 with a user interface to applications running on the server 1. Since the first and second client computers 3, 4 are not intended for operation as stand-alone devices, but merely to provide input to and receive output from applications running on the server 1, their processing capacity can be limited. Likewise, they can have limited or no capacity for permanently storing data. The first and second client computers 3,4 are merely provided with such processing capacity and memory as are necessary to process the input and display output, and exchange these with the server 1 over the network 2. For this reason, they are also known as thin clients or network computers.

The system of FIG. 1 also comprises a third client computer 5, which does comprise means 6 for locally running an application, i.e. the necessary processing power, memory and data storage capacity. When an application is run locally, the processor in the third client computer 5 executes the application code. Because of these extended capabilities, computers such as the third client computer 5 are also known as fat clients.

There are several reasons as to why it should be desirable to include such fat clients in a server-based computing system. It is possible that an application is not suitable for running centrally. If migration is taking place from a system wherein all applications are run locally, to a central server-based computing environment, some of the old, so-called legacy software might still be needed. Other applications cannot be centrally run in principle, e.g. streaming media applications. Certain applications require specialised graphics capabilities that are best provided locally, or they rely on a locally attached device, for instance a scanner or dongle. In other cases, it might simply be cheaper to have several single-user licenses rather than a multi-user license. It might also be necessary to include in the network 2 workstations with the capability of running an additional or different operating system.

In addition, it might be necessary or useful to have a fall-back mechanism for mission-critical applications that are installed on the server 1. If the server 1 should fail, access to a mission-critical application will be impossible until the problem with the failed server 1 has been solved. If, in such a situation, it is possible to run the application on the third client computer 5, the impact on the user organisation is limited to not being able to use the other, non-mission critical applications installed on the server 1.

The third client computer 5 shown in FIG. 1 comprises a monitor with a screen 7 for displaying a user interface to an application. It further comprises an input device 8. In the shown example, this is a keyboard, but other input devices can also be connected. The client computer 5 could additionally comprise a mouse, pointer, tablet, web-cam, microphone, etc. The input device 8 forms the means for providing input to an application through a user interface.

In the system according to the invention, a single user interface is provided to the client computers 3-5. It makes no difference to a user whether he is controlling the running of applications from the first client computer 3, a thin client, or the third client computer 5, a fat client. The only difference is that on the third client computer 5, additional, locally running applications can be initiated and controlled. However, this is done through the one user interface provided by the server 1 for providing input to and receiving output from centrally running applications.

In the system according to the invention, the server 1 runs an interface management program in order to provide the client computers 3-5 with the user interface. The client computer 5 runs a subscriber program that facilitates the integration of client-based applications in the server-based user interface. The subscriber program running on the client computer 5 co-operates with the interface management program in the exchange between the server 1 and client computer 5 of user input to the interface and output from the interface. Communication between the server 1 and the client computer 5 consists of messages generated by the interface management program and the subscriber program respectively.

FIGS. 2A-D show schematically the composition of the display of the user interface. The figures refer to several situations that occur in embodiments of the system according to the invention.

Figure 2A:
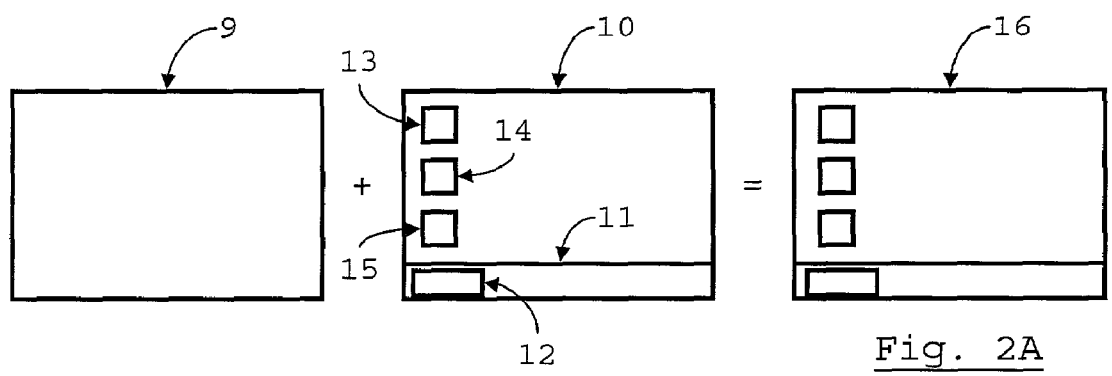
FIG. 2A-D show the composition of the display of the user interface in different situations during use of an embodiment of the system according to the invention.

FIG. 2A shows a local client screen area 9. This is a screen area generated locally on the client computer 5. FIG. 2A further shows a central application screen area 10. This screen area is generated on the server 1. It comprises a display of output from any applications running centrally on the server 1 and components that are generated by the interface management program regardless of whether any applications are running on the server 1.

These last-mentioned components comprise a central task bar 11, allowing the user to control the display of output. A button 12 on the task bar 11 forms a means for selecting and changing features of the interface. Further buttons can be present, depending on how many applications are running at any one moment.

The central application screen area 10 further comprises icons 13-15, which can be selected to launch an application. A first icon 13 launches a server-based application. A second and third icon 14 and 15 respectively, form the means for initiating locally running applications.

In a preferred embodiment a database in the system comprises information on the available applications that can be run locally on the client computer 5, so that the icons 14, 15 for each of these applications can be generated by the server 1. This database can be stored at one location in the system, for example in the server 1, or parts can be stored locally, for instance in a registry file, and referred to when necessary. Other embodiments are conceivable wherein a number of messages are exchanged between client computer 5 and server 1, for instance when the client computer (5) goes on-line, in order that the latter can establish which icons to generate.

The local client screen area 9 and the central application screen area 10 are merged into one local client screen 16, which is the screen image shown on the screen 7 of the client computer 5. In the preferred embodiment this merging is taken care of by the subscriber program on the client computer 5, after data relating to the contents of the central application screen area 10 has been transferred to the client computer 5. An alternative embodiment is conceivable, wherein the merging is done on the server 1, after the contents of the local client screen area 9 have been transferred to the server 1. The merged local client screen 16 would then be transferred back from the server 1 to the client computer 5.

The subscriber and interface management programs also allow the server 1 to control the display of the user interface on the screen 7 of the third client computer 5. The server 1 controls the display properties of the interface, which comprise, for instance, the desktop size and display resolution, and adapts them to the screen 7 of the client computer 5. The interface management program generates this information. The subscriber program on the client computer 5 ensures display on the screen 7 according to the specified properties.

Figure 2B:
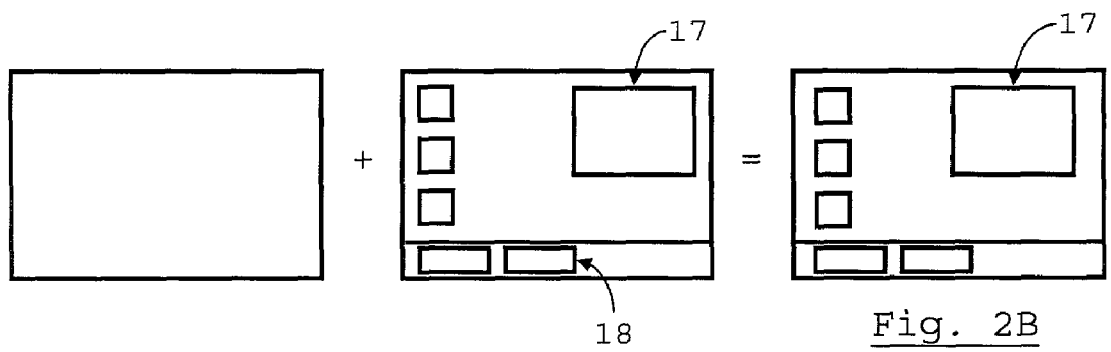

Any changes in either the local client screen area 9 or the central application screen area 10 automatically result in an updated version of the merged local client screen 16. One such change can occur, when an application on the server 1 has been launched by clicking the first icon 13. FIG. 2B shows how this leads to a changed local client screen 16. The application running on the server 1 generates a window 17 in which output from the application is displayed. Of course, within the scope of the invention, some applications can generate more than one window. The creation of the window 17 leads to the creation of a button 18 in the central task bar 11. As described before, the local client screen area 9, which in this case is still empty, and the central application screen area 10 are merged into the merged local client screen 16. A user of the client computer 5 can switch to the application by clicking the button 18.

Figure 2C:
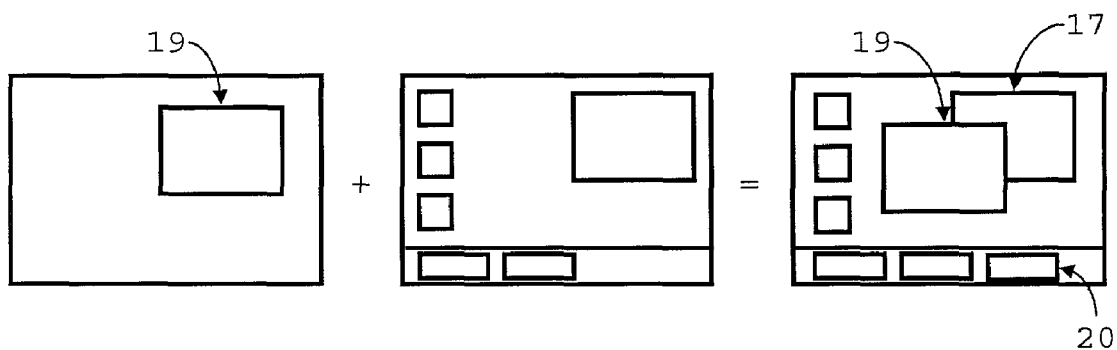

In FIG. 2C the situation is shown, wherein the user has launched an application running locally on the client computer 5, by clicking one of the two icons 14, 15. The exact procedure followed in the system as a result of this launch command is described in further detail below with reference to FIG. 3. The result of the launch of a second application, running locally on the client computer 5, is a window 19 in the local client screen area 9, containing the output of the locally running application. As before, the local client screen area 9 is merged with the central application screen area 10, which in FIG. 2C is unchanged with respect to the FIG. 2B, into the merged local client screen 16. Changes in the contents of the window 19 automatically result in an updated version of the merged local client screen 16.

As a result of the launch of the locally running second application, there are now two windows 17, 19 in the merged local client screen 16. A user can make one of the windows 17, 19 active, by clicking on that window. As a result of this clicking action, a signal generated by the subscriber program is sent from the client computer 5 to the server 1, to ensure that the user interface can correctly indicate the active window to the user.

When a new window appears in the local client screen area 9 or in the central application screen area 10, either because an application has just been launched, or because the application has generated a new window in the course of its execution, this is detected. Thus, the new window can be displayed in the merged local client screen 16. A communication to the server 1 further leads to the creation of a button 20 in the central task bar 11 of the merged local client screen 16, in order that a user can switch to a newly initiated locally running application.

In a similar way, the disappearance of the window 19 associated with the locally running application is communicated to the server 1. The window can disappear when execution of the application has finished, or when there are several windows belonging to one locally running application and the application no longer needs one of them. Using the subscriber program, a signal is sent from the client computer 5 to the server 1 indicating that the window 19 has been closed, so that the user interface can display the correct buttons 12, 18, 20 in the task bar 11, both of applications running on the server 1 and of applications running on the client computer 5.

In an advantageous embodiment of the invention, a window further comprises a title area, not shown. The title can change in the course of running the application associated with a window. The buttons 12, 18, 20 comprise a caption relating to the title. If the title of the window 17 associated with the locally running application changes, a signal is generated and communicated to the server 1, using the interface management and subscriber programs. The captions in the central task bar 11 are then automatically updated.

Similarly, each button 12, 18, 20 comprises an icon representing the application associated with it. The icon can also change in the course of time. Changes lead to an automatic update of the central application screen area 10 and merged local client screen area 16 in a manner similar to the mechanism used when a caption needs to be updated.

When the user clicks on one of the buttons 12, 18, 20, this input is signalled to the server 1. If the user has clicked on the button 18 associated with the application running on the server 1, the interface management program ensures that the user can control that application through the interface. If the user has clicked on the button 20 associated with the locally running application, a switch is made to that application. In this process, messages are exchanged between the server 1 and the client computer 5, which are handled by the subscriber program and the interface management program.

The protocol by which signals are exchanged between the client computer 5 and the server 1 further allows for the termination of all locally running applications. The server 1 sends a command to the client computer 5 to terminate the running applications. When all applications have successfully been shut down, this is communicated to the server 1, which can then update the user interface.

Figure 2D:
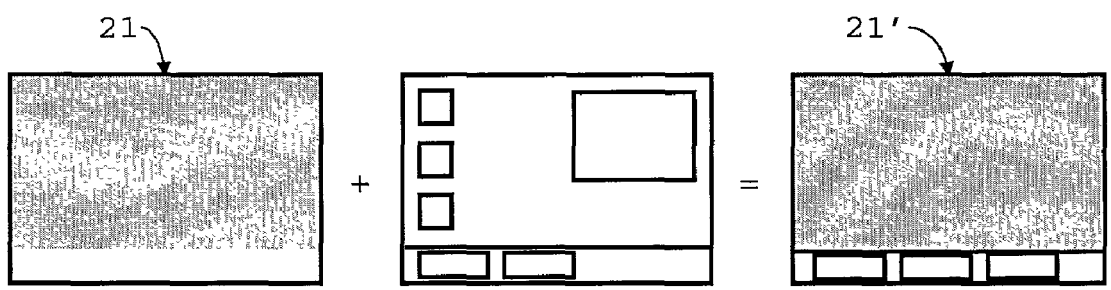

A user can also maximise the window 19 associated with the locally running application, as is shown in FIG. 2D. A maximised window 21 now fills the local client screen area 9. A transferred version 21' of the maximised window 21 in the merged local client screen 16 does not, however obscure the central task bar 11, so that a user can still switch between applications. This follows from the fact that the server comprises means for controlling the display of the local client screen 16 on the screen 7 of the client computer 5.

Figure 3:
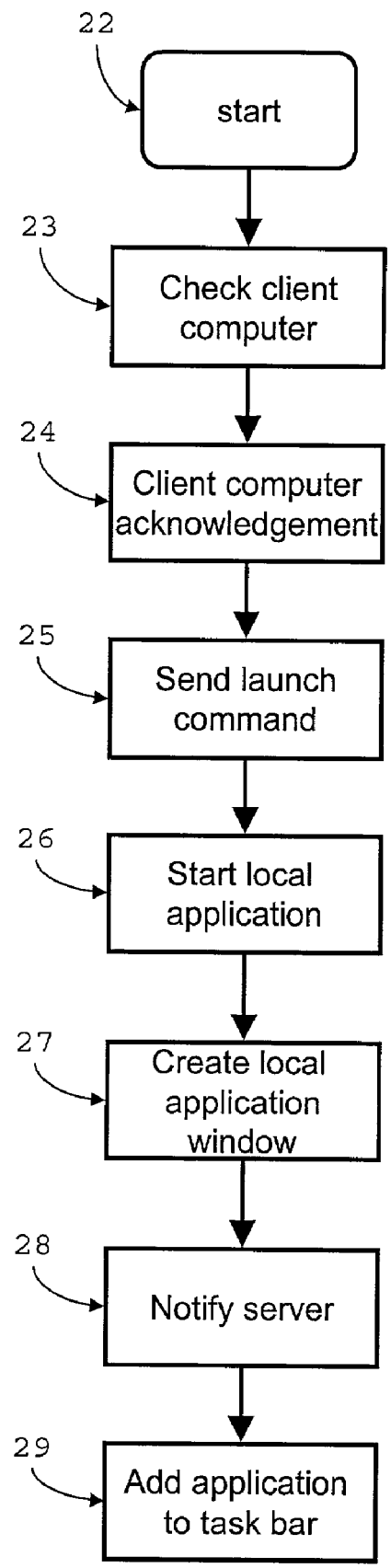
FIG. 3 shows schematically some steps in an embodiment of the method according to the invention, which describe in more detail the process by which a locally run application is launched.

Turning now to FIG. 3, a more detailed description of the process, by which the running of an application on the client computer 5 is initiated, will be given. The process is started in a first step 22, by a user clicking on one of the icons 14, 15 for initiating locally run applications. The interface management program processes this input. Once it has been determined that the icon is associated with a local application on the client computer 5, a message is sent in a subsequent step 23 to the client computer 5, to check that the subscriber program is running. In a next step 24, the client computer 5 returns an acknowledgement message, generated using the subscriber program, to the effect that the subscriber program is running.

The interface management program on the server 1 generates a message, containing a command line, which is sent to the client computer 5 in a subsequent step 25. In a next step 26, the locally running application is launched on the client computer 5 by executing the command line.

The locally running application generates its window 19, which first appears in the local client screen area 9. As the merged local client screen 16 is automatically updated, the window 19 also appears in the merged local client screen 16. The creation of the local application window 19 is symbolically depicted in step 27 of FIG. 3.

In a step 28 subsequent upon the creation of the local window 19, the subscriber program generates a message, signalling the creation of a new application window, which message is passed on to the server 1. This is the cue for a last step 29 in the flow chart of FIG. 3, namely the addition of the button 20 to the central task bar 11 in the merged local client screen 16. The local application is now fully integrated into the user interface and the situation depicted in FIG. 2C has been arrived at.

Those skilled in the art will appreciate that the invention is not limited to the above-described embodiment, which can be varied in a number of ways within the scope of the claims. For instance, embodiments of the system can exist that comprise additional means, e.g. function keys, for switching between windows and/or applications.

The invention claimed is:

1. A server-based computing system comprising:
   at least one server running an application and at least one client computer locally running at least one further application, the at least one client computer and the at least one server being connected through a network,
   wherein the at least one server:

provides the at least one client computer with a user interface comprising a central screen that enables initiation of the application and the at least one further application using said central screen;

detects an initiation of the at least one further application at the at least one client computer;

determines that a detected initiation of the at least one further application relates to initiation of the locally run further application;

provides a command to the at least one client computer over the network to launch the at least one further application after initiation of the at least one further application via the central screen, and wherein the at least one client computer comprises:

an input device for providing input to the application and the at least one further application;

a display device for presenting output from the application and the at least one further application; and wherein the at least one client computer:

launches the at least one further application in response to receiving the command from the at least one server over the network, generates a local screen, said local screen comprising a window associated with the at least one further application, said window being generated by launching the at least one further application in response to receiving the command from the at least one server over the network;

receives the user interface comprising the central screen from the at least one server;

merges the local screen and the central screen to provide a merged screen integrating the application and the at least one further application into the user interface; and displays the merged screen on the display device.

2. The server-based computing system according to claim 1, wherein the at least one server provides a taskbar comprising buttons for the application and the at least one further application in the user interface for the at least one client computer.

3. The server-based computing system according to claim 2, wherein the at least one server receives a signalling message from the at least one client computer signalling that the window has been generated and to include a button for the at least one further application in the taskbar in response to receiving the signalling message.

4. The server-based computing system according to claim 2, wherein said system exposes the taskbar on the display device upon maximizing the window associated with the at least one further application.

5. The server-based computing system according to claim 1, wherein said at least one client computer enables initiation of termination of the at least one further application and wherein the at least one server receives a termination signal from the at least one client computer in response to initiation of termination of the application on the at least one client computer and sends a termination command to the at least one client computer to terminate the application in response to receiving the termination signal.

6. The server-based computing system according to claim 1, wherein the at least one server accesses information on available further applications that can be run locally at the at least one client computer.

7. A client computer configured for connection to a server through a network, said server being configured for running an application and said client computer running at least one further application, wherein the client computer comprises:

an input device for providing input to the application and the at least one further application; and a display device for presenting output from the application and the at least one further application;

wherein said client computer:

receives a user interface from the server, the user interface comprising a central screen that enables initiation of the application and the at least one further application;

receives a command from the server over the network to launch the at least one further application after initiation of the at least one further application via the user interface;

launches the at least one further application in response to receiving the command from the server over the network;

generates a local screen, said local screen comprising a window associated with the at least one further application generated by launching the at least one further application in response to receiving the command from the server;

merges the local screen and the central screen to provide a merged screen to integrate the application and the at least one further application into the user interface; and displays the merged screen on the display device.

8. A computer program stored in a storage memory, the computer program comprising software code portions for running on a client computer, said client computer being configured for connection to a server through a network and running at least one further application, said server being configured for running an application, said client computer comprising an input device for providing input to the application and the at least one further application and a display device for presenting output from the application and the at least one further application, said software code portions, when run on said client computer, performing the steps of:

receiving a user interface from the server, the user interface comprising a central screen that enables initiation of the application and the at least one further application;

receiving a command from the server over the network to launch the at least one further application after initiation of the at least one further application via the user interface;

launching the at least one further application in response to receiving the command from the server over the network, generating a local screen, said local screen comprising a window associated with the at least one further application, said window being generated by launching the at least one further application in response to receiving the command from the server;

merging the local screen and the central screen to provide a merged screen integrating the application and the at least one further application into the user interface; and displaying the merged screen on the display device.

* * * * *